United States Patent
Ludwig et al.

(10) Patent No.: US 7,962,146 B2
(45) Date of Patent: Jun. 14, 2011

(54) METHOD AND APPARATUS FOR ALLOCATING BANDWIDTH IN A WIRELESS COMMUNICATION SYSTEM

(75) Inventors: Reiner Ludwig, Hürtgenwald (DE); Per Magnusson, Linköping (SE)

(73) Assignee: Elefonaktiebolaget L M Ericsson (Publ), Stockholm (SE)

( * ) Notice: Subject to any disclaimer, the term of this patent is extended or adjusted under 35 U.S.C. 154(b) by 623 days.

(21) Appl. No.: 12/095,831

(22) PCT Filed: Dec. 2, 2005

(86) PCT No.: PCT/SE2005/001823
§ 371 (c)(1),
(2), (4) Date: Jun. 2, 2008

(87) PCT Pub. No.: WO2007/064267
PCT Pub. Date: Jun. 7, 2007

(65) Prior Publication Data
US 2008/0274747 A1    Nov. 6, 2008

(51) Int. Cl.
*H04W 72/00* (2009.01)
(52) U.S. Cl. ............... 455/450; 455/451; 455/452.1
(58) Field of Classification Search .......... 455/450–454; 370/229–235, 329, 330
See application file for complete search history.

(56) References Cited

U.S. PATENT DOCUMENTS

| 6,016,311 A | 1/2000 | Gilbert et al. |
| 7,653,396 B2 * | 1/2010 | van der Gaast et al. ...... 455/450 |
| 2003/0050074 A1 * | 3/2003 | Kogiantis et al. ............. 455/453 |

FOREIGN PATENT DOCUMENTS

| EP | 1 193 988 A2 | 4/2002 |
| GB | 2 401 508 A | 11/2004 |
| RU | 2 246 793 C1 | 2/2005 |
| WO | WO 2004/016007 A1 | 2/2004 |

* cited by examiner

*Primary Examiner* — George Eng
*Assistant Examiner* — Nam Huynh

(57) ABSTRACT

Network resources can be allocated more efficiently to communication sessions in a wireless telecommunications network, by the method of—monitoring the traffic load in the uplink and downlink direction in the network,—for the at least one session, determining the parameters ul_ratio and dl_ratio, given as ul_ratio=ul_throughput/(ul_throughput+dl_throughput) dl_ratio=dl_throughput/(ul_throughput+dl_throughput) wherein ul_throughput is the throughput in the uplink for the at least one communication session and dl_throughput is the throughput in the downlink for the at least one communication session, and—allocate resources to the at least one session in dependence of the traffic load and ul_ratio and dl_ratio, by allocating resources in the uplink in dependence of the dl_ratio and/or allocating resources in the downlink in dependence of the ul_ratio.

19 Claims, 2 Drawing Sheets

METHOD AND APPARATUS FOR ALLOCATING BANDWIDTH IN A WIRELESS COMMUNICATION SYSTEM

TECHNICAL FIELD

The present invention relates to a control node as defined in the preamble of claim 1 and to a method as defined in the preamble of claim 9.

BACKGROUND AND PRIOR ART

Bandwidth is a limited resource in any wireless communication network. As mobile terminals become more and more common, the demand for wireless communication capacity increases steadily.

Therefore, it becomes increasingly important to allocate the available bandwidth in a wireless communication system in the best possible way, in order to use the available bandwidth as efficiently as possible.

U.S. Pat. No. 6,925,068 discloses a method for allocating bandwidth in a wireless communication system. Time slots may be allocated in a flexible way for uplink or downlink transmissions depending on the bandwidth needs of a channel. Channel bandwidth asymmetry can be achieved in the sense that more time slots may be allocated in one direction than in the other direction (that is, more for downlink transmission than for uplink transmission, or vice versa). The designation of any time slot can be changed dynamically between uplink and downlink depending on the requirements. The decisions are based on reports of sessions that have been denied because of capacity problems.

U.S. Pat. No. 6,628,626 discloses a method for enabling high-speed data transfer in the downlink direction by using an additional wideband communication channel from the base station to the mobile terminals. This principle is based on the assumption that the bandwidth requirements are higher in the downlink direction than in the uplink direction. This is generally, but not always, correct.

WO 00/01188 discloses a method of allocating traffic channels to mobile terminals in dependence of various communication quality parameters in order to allocate channels more effectively in the wireless network.

The scheduling algorithms known in the art do not consider that each traffic session is bidirectional and that a scheduling decision in one direction will also affect the session behaviour in the other direction.

OBJECT OF THE INVENTION

It is an object of the invention to control the utilization of the capacity in a wireless network in such a way that both the uplink and the downlink capacity is maximized while avoiding congestion situations.

SUMMARY OF THE INVENTION

This object is achieved according to the present invention by a control node for use in a wireless communication network, for allocating network resources to at least one communication session in the wireless telecommunications network, comprising resource allocation means for allocating resources to the at least one session in dependence of traffic load information regarding the traffic load in the uplink and downlink directions in the network, and an ul_ratio and a dl_ratio per communication session for the at least one communication session, given as $ul\_ratio = ul\_throughput/(ul\_throughput + dl\_throughput)$ $dl\_ratio = dl\_throughput/(ul\_throughput + dl\_throughput)$ wherein ul_throughput is the throughput in the uplink for the at least one communication session and dl_throughput is the throughput in the downlink for the at least one communication session, and the resource allocation means is arranged to allocate resources in the uplink in dependence of the dl_ratio and/or allocating resources in the downlink in dependence of the ul_ratio.

The object is also achieved by a method of allocating network resources to at least one communication session in a wireless teleconmunications network, comprising the steps of monitoring the traffic load in the uplink and downlink direction in the network, for the at least one session, determining the parameters ul_ratio and dl_ratio, given as $ul\_ratio = ul\_throughput/(ul\_throughput + dl\_throughput)$ $dl\_ratio = dl\_throughput/(ul\_throughput + dl\_throughput)$ wherein ul_throughput is the throughput in the uplink for the at least one communication session and dl_throughput is the throughput in the downlink for the at least one communication session, and allocate resources to the at least one session in dependence of the traffic load and ul_ratio and dl_ratio, by allocating resources in the uplink in dependence of the dl_ratio and/or allocating resources in the downlink in dependence of the ul_ratio.

In contrast, prior art scheduling algorithms typically consider the uplink and the downlink independently of each other when making a scheduling decision.

The inventive idea is based on the fact that most traffic sessions have a deterministic behaviour. A session follows a deterministic signalling sequence because the two user terminals participating in the session have agreed to a protocol (standardized or proprietary) in order to be able to communicate. According to the invention, the deterministic behaviour for each traffic session is analyzed and this knowledge is used when performing a joint uplink/downlink scheduling decision. The deterministic behaviour is analyzed in a protocol-independent fashion, that is, no knowledge about any specific communication protocol is required.

In a preferred embodiment, the control node further comprises monitoring means for obtaining traffic load information about the traffic load in the uplink and downlink direction in the network, and calculating means for the at least one session, determining the parameters ul_ratio and dl_ratio. Alternatively, the monitoring means and calculating means may be implemented in separate units or in one separate unit outside of the control node.

The monitoring means may be arranged to identify any spare capacity in the uplink and/or the downlink. In this case, the resource allocation means is arranged to increase the scheduling priority in the downlink direction for the at least one session, if spare capacity is detected in the uplink direction and the at least one session has a high ul_ratio. Similarly, the resource allocation means may be arranged to increase the scheduling priority in the uplink direction for the at least one session, if spare capacity is detected in the downlink direction and the at least one session has a high dl_ratio. These two functions may be implemented together or just one of them may be used.

In some cases, the transmission of large amounts of data in the first direction is dependent on transmission of small amounts of data, such as acknowledgements, in the opposite direction. According to the invention if there is spare capacity in the first direction, efficient use of the capacity in the first direction is ensured because the small amounts of data in the opposite direction are given a higher priority. Thus, the waiting time before data can be sent in the first direction is reduced, and the spare capacity is used more efficiently.

The monitoring means may arranged to identify overload or congestion in the uplink and/or the downlink. In this case, the resource allocation means may be arranged to decrease the scheduling priority in the downlink direction for the at least one session if overload or congestion is detected in the uplink direction and the at least one session has a high ul_ratio. Similarly, the resource allocation means may be arranged to decrease the scheduling priority in the uplink direction for the at least one session if overload or congestion is detected in the downlink direction and the at least one session has a high dl_ratio.

The inventive method of reducing congestion in one direction by decreasing scheduling priority in the opposite direction is beneficial for two main reasons: Firstly, it provides a quicker way of providing feedback to the presumed traffic generating source, that is, the sender. Also it leads to a smoother generation of the source traffic.

For example, for the transmission control protocol (TCP) a TCP sender is said to be "ACK clocked" since it can only send data packets at the rate at which it receives ACKs. If only the priority in the data direction of a bulk data transfer was decreased while maintaining the priority in the ACK direction, the ACKs would, at least initially, continue to return at the same rate. This might cause even more congestion in the data direction since the TCP sender would continue to clock out data packets at the same rate. On the other hand, decreasing the priority in the ACK direction will lead to a reduced rate of ACKs, which will immediately lead to a reduced transmission rate of data packets. This also reduces the risk of further packet loss caused by congestion.

The detection of spare capacity on the one hand and overload or congestion on the other hand may be implemented together, or just one of them may be used.

According to the invention, the overall throughput in the system is increased so that both uplink and downlink capacity are used to their maximum extent, based on the current user traffic. Congestion can be avoided by smooth degradation of individual traffic flows. Instead of decreasing scheduling priority for the traffic in the congested direction, traffic session priority is decreased in the other direction for sessions having a high throughput ratio in the congested direction.

Preferably, the calculating means is arranged to calculate the ul_ratio and the dl_ratio as average values over a certain period of time, for example, as smoothed moving averages.

The inventive control node and method may be used in any type of telecommunication network in which communication is performed across a radio interface. The invention will be particularly useful in networks in which the relationship between the uplink and the downlink capacities cannot be changed easily.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
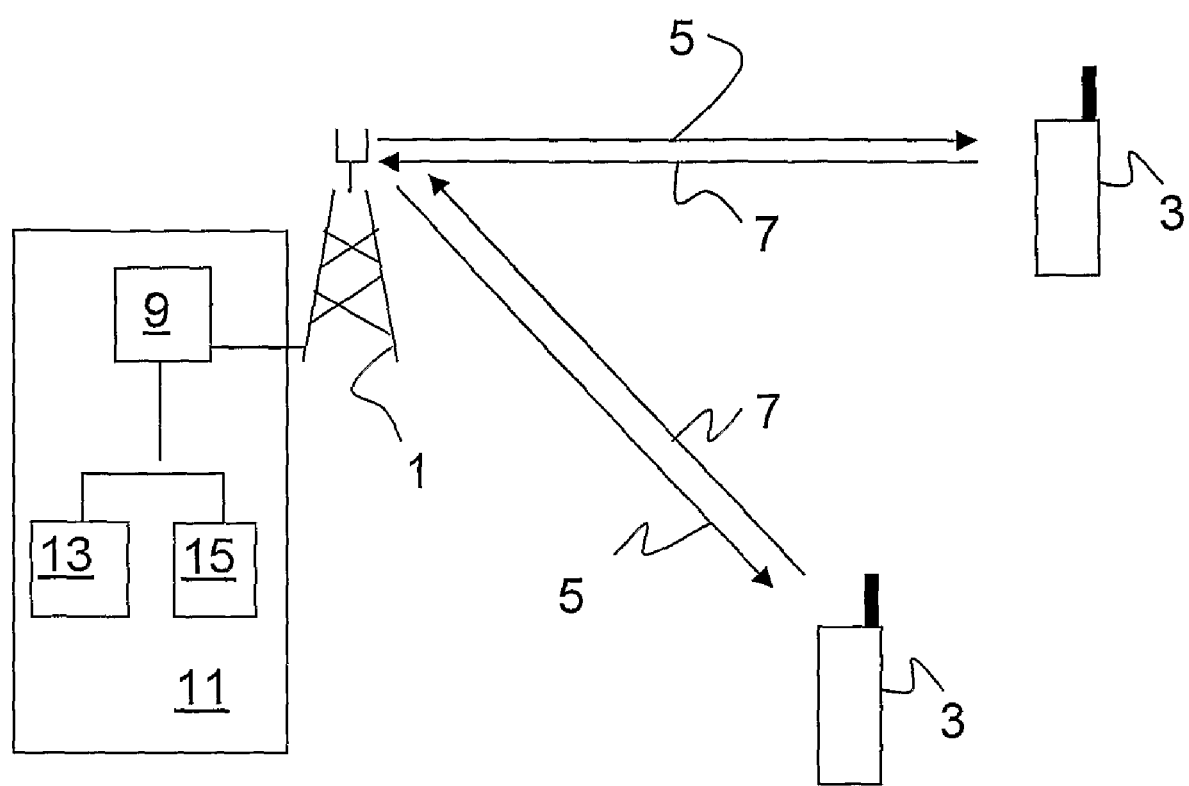
FIG. 1 illustrates communication between two user terminals and a base station in a wireless communication network.

FIG. 1 illustrates a part of a wireless communication network, represented in FIG. 1 by a base station 1, communicating with a number of user terminals 3 in a cell of the network. The two user terminals may be engaged in two-way communication with each other, or with other units in the network, or may be uploading data to the network or downloading data from the network. The downlink communication from the base station 1 to each of the terminals 3 is illustrated by arrows 5. The uplink communication from the terminals 3 to the base station is illustrated by arrows 7.

The network also comprises at least one scheduling node 9 for scheduling the traffic. This node is usually found in, or in connection to, the base station 1. In FIG. 1 the scheduling node 9 is shown as part of a control node 11 introduced according to the invention. The control node 11 also comprises a monitoring unit 13 arranged to monitor the traffic in the network, both in the uplink and downlink directions. The control node 11 also comprises a calculating unit 15 arranged to calculate the uplink ratio and the downlink ratio, as will be defined below, for each communication session in the network, or in the cell.

Of course, the division of the control means into units is merely for illustrative purposes. The scheduling node 9, monitoring unit 13 and calculating unit 15 may be software modules comprised in the same control node 11 or may be implemented in separate units.

The scheduling node 9 will make scheduling decisions based on the information obtained according to the invention, possibly combined with other information used in the prior art. The priority information obtained according to the invention will vary much more slowly than some of the other scheduling information, such as fast fading aspects.

In the situation shown in FIG. 1, for example, the network may have, at a given time, a high load on the uplink but a lot of spare capacity on the downlink. If, in this case, one terminal 3 wishes to download an object using TCP, the problem occurs that acknowledgement messages from the terminal 3 must compete with all the other uplink traffic, even though the average uplink bitrate required by the first terminal is fairly low. In this case the downlink communication may be held up because acknowledgement messages cannot be communicated in the uplink direction. By increasing the uplink priority of the terminal 3 concerned, the throughput for this terminal, as well as the overall downlink utilization is increased. The deterministic behaviour is analyzed in a protocol-independent fashion, that is, no knowledge about any specific communication protocol is required. Therefore, the method according to the invention will work for any kind of protocol, and is not dependent on, for example, TCP.

The method according to the invention will be particularly useful for sessions having a high asymmetry between the uplink and the downlink. This is the case, for example, if a user is downloading information from the network or uploading information to the network. It is also the case for a user retrieving e-mail from the network. The amount of data to be transmitted in the downlink direction is generally large, whereas only small orders and acknowledgements need to be transmitted in the uplink direction. The correlation between the uplink and the downlink traffic rate for a particular session is generally relatively constant over time.

The basic solution according to the invention is to detect the correlation between the downlink bitrate and the uplink bitrate for each traffic session and use this as input to the scheduling decision.

Figure 2:
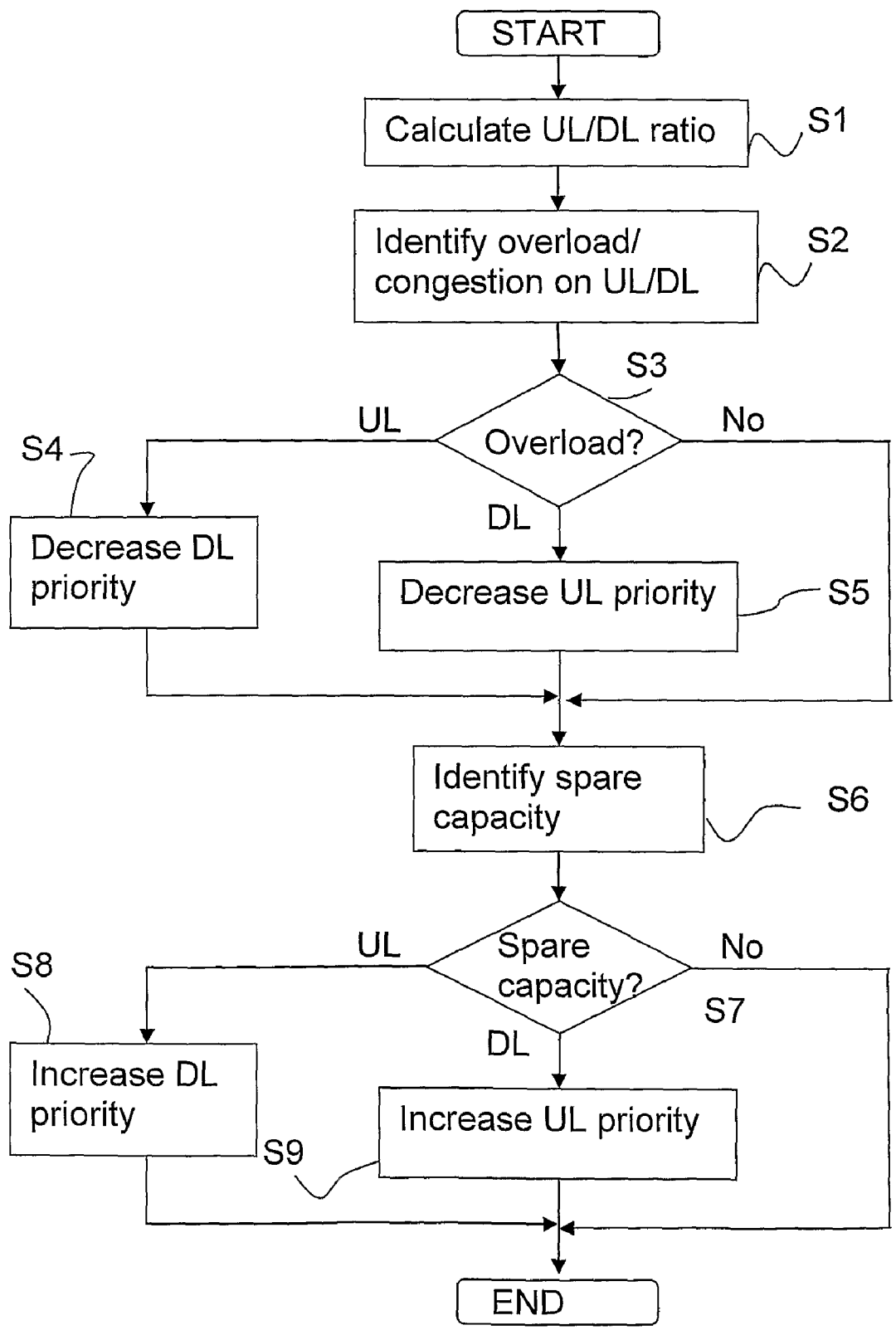
FIG. 2 is a flow chart of the inventive method.

A more detailed description of how this may be achieved is given in FIG. 2. In step S1 the ratio between the UL and the DL bit rate for each traffic session is calculated. A strong correlation between uplink and downlink throughput for a traffic session is assumed, and the following ratios are calculated:

$$ul\_ratio = ul\_throughput/(ul\_throughput + dl\_throughput)$$

$$dl\_ratio = dl\_throughput/(ul\_throughput + dl\_throughput)$$

where ul_throughput is the throughput in the uplink for a particular traffic session and dl_throughput is the throughput in the downlink for the same traffic session. Further, ul_ratio=1−dl_ratio.

The ratios should be averaged over time to decrease the effects of the burst character of the communication. Preferably, the ratios are maintained as a form of smoothed moving average.

In step S2 any overload or congestion situation on an uplink or downlink connection is identified. To do this, the total traffic is monitored using methods known per se. Overload occurs, for example, if the quality of service promised to certain users cannot be achieved. In this case, the resources allocated to other users may have to be limited to achieve the appropriate quality of service. Congestion occurs if there is so much traffic that some traffic is effectively blocked. Congestion may therefore be seen as an extreme form of overload. Generally in this document the term overload is used both for overload and for congestion as defined above.

In step S3 the course of action is determined in dependence of the overload situation. If overload was detected on the uplink, go to step S4; if overload was detected on the downlink, go to step S5; if no overload or congestion is detected, go to step S6.

Step S4: Decrease the downlink scheduling priority for users having a high ul_ratio. Go to step S6.

Step S5: Decrease the downlink scheduling priority for users having a high dl_ratio. Go to step S6.

Step S6: Identify any spare capacity on the uplink or downlink connection. This is done by monitoring the traffic using methods known per se.

Step S7: Determine the course of action in dependence on the capacity situation. If spare capacity is found on the uplink, go to step S8; if spare capacity is found on the downlink, go to step S9; if no spare capacity is found, or if spare capacity is found on both the uplink and the downlink: end of procedure.

Step S8: Increase the downlink scheduling priority for users having a high ul_ratio.

Step S9: Increase the uplink scheduling priority for users having a high dl_ratio.

Steps S1-S5 and steps S6-S9, respectively, may be performed as two separate methods, or the method could start with step S6-S9 and continue with steps S1-S5. The two methods may also be carried out in parallel.

The procedure may be carried out continuously based on an autoloop, or at regular time intervals, to provide input information to the scheduling decisions. The procedure may also be carried out at irregular intervals, determined based on the traffic rate, the occurrence of overload or any other parameter. The scheduler may perform one or both methods S1-S5 and S6-S9 for each packet that is to be transmitted.

As mentioned above, the scheduling node may make scheduling decisions based on the information obtained according to the invention, in combination wither information used for scheduling. Such other information may for example be the radio performance, that is, channel quality etc. Information regarding individual flows may be obtained from layers 3 and 4 (for example, TCP and IP) to prioritize traffic on a per flow basis. The inventive method may be applied only to certain transport protocols (for example, TCP). Information about the protocols used can be found in the protocol identifier field of the IP header. Traffic may also be scheduled based on the application used, such as www, FTP, outlook exchange synchronization, etc. Information about the applications may be obtained from the traffic flow (for example, TCP and/or UDP port numbers).

The invention claimed is:

1. A control node for use in a wireless communication network, for allocating network resources to at least one communication session in the wireless telecommunications network, comprising resource allocation means for allocating resources to the at least one session in dependence of traffic load information regarding the traffic load in the uplink and downlink directions in the network, and an ul_ratio and a dl_ratio per communication session for the at least one communication session, given as $$ul\_ratio = ul\_throughput/(ul\_throughput + dl\_throughput)$$

$$dl\_ratio = dl\_throughput/(ul\_throughput + dl\_throughput)$$

wherein ul_throughput is the throughput in the uplink for the at least one communication session and dl_throughput is the throughput in the downlink for the at least one communication session, and the resource allocation means is arranged to allocate resources in the uplink in dependence of the dl_ratio and/or allocating resources in the downlink in dependence of the ul_ratio.

2. A control node according to claim 1, further comprising monitoring means for obtaining traffic load information about the traffic load in the uplink and downlink direction in the network, calculating means for the at least one session, determining the parameters ul_ratio and dl_ratio.

3. A control node according to claim 1, wherein the monitoring means is arranged to identify any spare capacity in the uplink and/or the downlink.

4. A control node according to claim 3, wherein the resource allocation means is arranged to increase the scheduling priority in the downlink direction for the at least one session, if spare capacity is detected in the uplink direction and the at least one session has a high ul_ratio.

5. A control node according to claim 3, wherein the resource allocation means is arranged to increase the scheduling priority in the uplink direction for the at least one session, if spare capacity is detected in the downlink direction and the at least one session has a high dl_ratio.

6. A control node according to any one of the claim 1, wherein monitoring means is arranged to identify overload or congestion in the uplink and/or the downlink.

7. A control node according to claim 6, wherein the resource allocation means is arranged to decrease the scheduling priority in the downlink direction for the at least one session if overload or congestion is detected in the uplink direction and the at least one session has a high ul_ratio.

8. A control node according to claim 6, wherein the resource allocation means is arranged to decrease the scheduling priority in the uplink direction for the at least one session if overload or congestion is detected in the downlink direction and the at least one session has a high dl_ratio.

9. A control node according to any one of the claim 2, wherein the calculating means is arranged to calculate the ul_ratio and the dl_ratio as average values over a certain period of time.

10. A control node according to claim 9, wherein the calculating means is arranged to calculate the ul_ratio and the dl_ratio as smoothed moving averages.

11. A method of allocating network resources to at least one communication session in a wireless telecommunications network, comprising the steps of
monitoring the traffic load in the uplink and downlink direction in the network,
for the at least one session, determining the parameters ul_ratio and dl_ratio, given as $ul\_ratio = ul\_throughput/(ul\_throughput + dl\_throughput)$ $dl\_ratio = dl\_throughput/(ul\_throughput + dl\_throughput)$ wherein ul_throughput is the throughput in the uplink for the at least one communication session and dl_throughput is the throughput in the downlink for the at least one communication session, and allocate resources to the at least one session in dependence of the traffic load and ul_ratio and dl_ratio, by allocating resources in the uplink in dependence of the dl_ratio and/or allocating resources in the downlink in dependence of the ul_ratio.

12. A method according to claim 11, wherein the step of monitoring the traffic load in the network comprises identifying any spare capacity in the uplink and/or the downlink.

13. A method according to claim 12, comprising the step of, if spare capacity is detected in the uplink direction and the at least one session has a high ul_ratio, increasing the scheduling priority in the downlink direction for the at least one session.

14. A method according to claim 11, comprising the step of, if spare capacity is detected in the downlink direction and the at least one session has a high dl_ratio, increasing the scheduling priority in the uplink direction for the at least one session.

15. A method according to any one of the claim 11, wherein the step of monitoring the traffic load in the network comprises identifying overload or congestion in the uplink and/or the downlink.

16. A method according to claim 15, comprising the step of, if overload or congestion is detected in the uplink direction and the at least one session has a high ul_ratio, decreasing the scheduling priority in the downlink direction for the at least one session.

17. A method according to claim 15, comprising the step of, if overload or congestion is detected in the downlink direction and the at least one session has a high dl_ratio, decreasing the scheduling priority in the uplink direction for the at least one session.

18. A method according to any one of the claim 11, wherein the ul_ratio and the dl_ratio are calculated as average values over time.

19. A method according to claim 18, wherein the ul_ratio and the dl_ratio are calculated as smoothed moving averages.

* * * * *